Dec. 28, 1948.
H. G. VORE
2,457,758
CAPPING MACHINE FOR FEEDING CAPS THROUGH
A HIGH FREQUENCY HEATING COIL
Filed Oct. 30, 1944
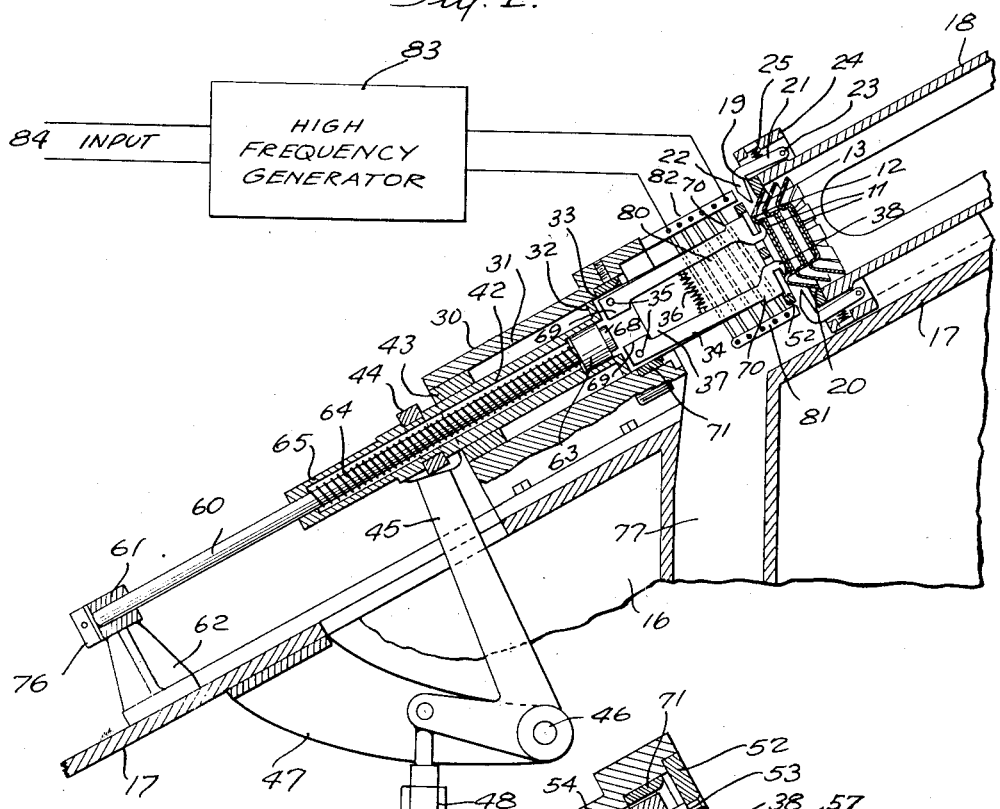
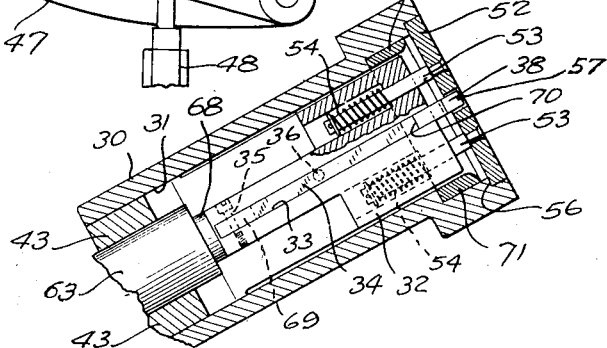
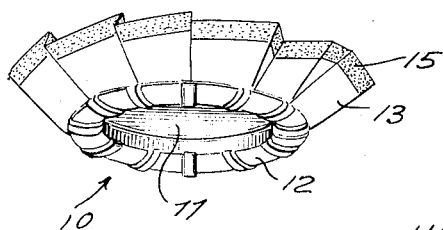
INVENTOR
HERBERT G. VORE
BY
ATTORNEY Patented Dec. 28, 1948

2,457,758

UNITED STATES PATENT OFFICE 2,457,758

CAPPING MACHINE FOR FEEDING CAPS THROUGH A HIGH-FREQUENCY HEATING COIL

Herbert G. Vore, Forest Hills, N. Y., assignor to American Seal-Kap Corporation of Delaware, Wilmington, Del., a corporation of Delaware Application October 30, 1944, Serial No. 561,060

5 Claims. (Cl. 226—88.1)

1

This invention relates to machines for applying to milk bottles, or the like, flexible skirted hood caps having a pleated skirt coated in whole or in part with a thermoplastic adhesive, and, more particularly, to a machine and method for heating the said adhesive to plasticizing temperatures prior to sealing the caps to the bottle by the application of pressure.

In U. S. Patent No. 2,325,163 to Carl W. Goodwin and Harold W. Martin, dated July 27, 1943, there is disclosed a capping machine including a magazine for a plurality of stacks of nested preformed caps which are arranged to be successively brought into operative position to feed the stacks of caps into a supply chamber from which they are successively withdrawn by means of a picker mechanism and are rolled along a feed chute on the lower edges of their skirts. The caps are fed by the chute to a capping station where they are held in position to be picked off by the horizontally advancing necks of successive milk bottles and to be carried thereby to a sealing station. The sealing station comprises a rotating turret having a plurality of sealing heads which are adapted to fold the skirts around the necks of the milk bottles and to hold the same under sealing pressure until the adhesive has cooled and set. The feed of the caps is so synchronized with respect to the feed of the milk bottles that the caps are successively fed to the capping station to meet the advancing milk bottles as they pass such station.

It is an object of the present invention to improve capping machines of the described general type.

It is another object of the present invention to provide a capping machine in which the caps having a band of thermoplastic adhesive around the pleated skirt thereof are exposed to the effect of high-frequency electromagnetic fields thereby to heat the said adhesive to plasticizing temperatures.

It is a further object of the invention to provide a capping machine in which the skirted caps bearing thermoplastic adhesive around the circumference thereof during their travel from the cap magazine to the sealing station are passed through a high frequency electromagnetic field and thus are practically instantaneously heated to a temperature at which the adhesive becomes at least partially fused or tacky and may be sealed on the neck of a milk bottle by the application of pressure.

Still another object of the invention is to provide a flexible skirted hood cap coated with a thermoplastic adhesive around the circumference of the pleated skirt thereof, said cap being of an electrically conductive character in at least a limited region thereof thereby to make possible the production of heat therein when such cap is exposed to a high frequency electromagnetic field for a short period of time.

It is also within the contemplation of the invention to incorporate a substantially tubular conductive coil energized by high frequency oscillations into a capping machine between two successive stations thereof through which the individually fed caps will pass and will be heated to temperatures at which a band of thermoplastic adhesive thereon becomes plastic and tacky so that the thus treated caps are ready for sealing by the sole application of controlled pressure.

It is also within the contemplation of the invention to provide a novel and improved heating device and method for preheating caps bearing thermoplastic adhesive prior to the sealing operation which is very simple, rapid, and dependable in its operation, and which may be readily applied to most capping machines now in use on a practical and industrial scale without requiring expensive changes in existing equipment.

Other and further objects and advantages of the invention will become apparent from the following description, taken in conjunction with the accompanying drawing, in which Fig. 1 is a longitudinal vertical sectional view through the picker mechanism of a capping machine embodying the principles of the present invention;

Fig. 2 is an enlarged horizontal sectional view taken in the plane of the axis of the picker showing certain details of the picker mechanism in retracted position; and Fig. 3 is a perspective view of a flexible skirted hood cap, having a band of thermoplastic adhesive around the pleated skirt thereof, of the type employed by the machine and in the method of the invention.

Broadly stated, in accordance with the principles of the present invention, means are provided to produce a high frequency electromagnetic field, such means being in the simplest case constituted by a substantially cylindrical coil with windings disposed in a single layer and connected to a source of high frequency energy, such as a suitable vacuum tube oscillator. A strong electromagnetic field alternating at a high frequency will be set up within the coil so that caps passed through the coil and at least partially constituted of electrically conductive material will absorb a portion of such energy. The absorbed energy will be converted to heat in a manner well understood and will raise the temperature of the thermoplastic adhesive sufficiently to render it plastic and tacky. Preferably, the said high frequency heating means are interposed between two appropriate stations of the capping machine so that preheating of the caps is accomplished substantially instantaneously during the normal travel of the cap between such stations. The practically instantaneous heating of the caps is assured by proper selection of the frequency of the source of high frequency energy which may be up to a megacycle or more and of the amount of high frequency power applied.

The caps 10 (Fig. 3) may be of the general type disclosed in the U. S. patent to Herbert G. Vore, No. 2,325,163 dated July 27, 1943, which comprises a central diaphragm or closure portion 11, an annular pouring lip housing 12, and a fluted skirt 13, carrying a band of thermoplastic adhesive 15 on the outer surface thereof. A disc may be positioned within the recess formed by the diaphragm 11 and the pouring lip housing 12 for increasing the holding power of the cap when seated on the internal ledge of a milk bottle.

In order to render the cap subject to the heating effect of a high frequency electromagnetic field, it is necessary to form the cap at least in part of an electrically conducting material, or to incorporate such material into the body of the cap or at least into the adhesive band of the cap. This may be accomplished in various ways. It is possible to form the caps of generally nonconducting sheet material which are subsequently coated, plated, sprayed or imprinted with conductive material at least in predetermined regions thereof. By restricting the conductivity of the cap to specific regions thereof, such as for example to that of the adhesive band, the advantage is obtained that the application of heating effect is confined to the adhesive band while the remaining portions of the cap remain substantially unheated. This is desirable not only for economy of operation but also because it avoids softening of the impregnating materials, such as paraffin, which are generally incorporated into the body of the cellulosic cap. Excellent results have been obtained by spraying the caps with an adhesive of the thermoplastic character which is mixed or filled with fine metal particles. In this manner, the electrical conductivity is confined to the thin layer of adhesive band having a very minute mass so that the adhesive band, and substantially only such band, is heated to the desired sealing temperatures by relatively small amounts of high frequency energy and within a very short time, of the order of a fraction of a second.

Referring now more particularly to the drawing, a preferred embodiment of the invention will be described in which the principles of the invention are applied to a capping machine of the type disclosed in the said U. S. Patent No. 2,325,163, and the high frequency heating means are interposed between the picker mechanism and the feed chute of the said machine. For the sake of simplicity only the picker mechanism and its association and cooperation with the high frequency heating means of the invention will be illustrated and described. As to the organization of the remaining associated elements of the machine, which do not form the objects of the present invention, reference may be had to the said U. S. patent.

In the drawing, reference character 16 denotes a bracket holding a housing 17, formed with a cap supply chamber 18 into which stacks of caps are fed by gravity. The supply chamber is provided at its discharge end with a cap retaining ring 19 having a bevelled inner surface 20. The bevelled surface 20 is adapted to engage and retain the skirt 13 of the forward cap so as to hold the stack of caps in the supply chamber 18 until the individual caps are successively removed by the picker mechanism. The retaining ring 19 is assisted in this holding operation by a plurality of spring-pressed retaining fingers 21, which are mounted on the housing 17 and are provided with points 22 which extend inwardly beyond the inner edge of the ring 19. The fingers 21 are pivoted as at 23 to ears 24 formed on the housing 17. The springs 25 normally hold the fingers 19 in their innermost position but permit retraction thereof as the caps are successively withdrawn through the opening in the ring 19.

The picker mechanism comprises a housing 30 mounted on the bracket 16 and forming a cylinder 31 in which a head 32 is slidably mounted. The head 32 is provided with a diametrical slot 33 in which picker fingers 34 are pivotally mounted by means of pins 35. A spring 36, extending between opposite picker fingers 34 in said slot 33, tends to hold said fingers 34 outwardly. The fingers 34 are provided with curved points 38 which are adapted to enter the recess in the cap formed by the depressed diaphragm 11 and engage the inner surface of the pouring lip housing 12. The head 32 carries a sleeve 42, which extends outwardly through a bearing 43 in said cylinder 30 and carries a collar 44 which is engaged by a forked arm 45 pivoted at 46 to a bracket 47 carried by the housing 17. The arm 45 is attached to a link 48 by means of which the head 32 is reciprocated.

A stripper plate 52 is carried on pins 53 (Fig. 2) which are slidably mounted in the head 32 and are normally held in a retracted position by springs 54 seated in bores 55 in said head 32. The stripper plate 52 seats against a shoulder 56 formed in the housing 30 to limit the rearward movement thereof and to permit the fingers 34 to be retracted beyond the forward surface of said plate. The stripper plate 52 is provided with slots 57 through which the fingers 34 extend when they are in the advanced position.

A rod 60 is seated within the sleeve 42 and is slidably held in a boss 61 carried in a bracket 62 attached to the housing 17. The rod 60 is provided with a head 63 sliding within the sleeve 42 and in a bore 37 in the head 32 and is normally held in advanced position by a spring 64 located in a bore 65 of said sleeve. The head 63 is provided with a shoulder 68 which is adapted to engage surfaces 69 formed on the fingers 34 for holding the fingers in retracted position. A collar 76 carried on the rod 60 engages the boss 61 to limit the forward movement of the rod.

The fingers 34 are provided with cam surfaces 70 adapted to engage the inner surface of a retracting ring 71 mounted within the cylinder 31 for retracting the fingers 34 on the rearward movement of the head 32. A discharge passage 77 is formed in the housing 17 to receive the caps from the picker mechanism.

The high frequency heating means comprise a single-layer coil 80 the windings of which are spacedly held with respect to each other by means of insulating ribs 81 and 82. Of these, rib 81 ends short of housing 30 of the picker mechanism, while rib 82 is extended to said housing and is secured thereto in any suitable manner. It will be noted that coil 80 is coaxial with cylinder 31 of the picker mechanism and is so arranged between cap supply chamber 18 and the open end of housing 30 that the cap withdrawn from the said chamber will be pulled through the coil during operation of the picker mechanism. Coil 80 is electrically connected to a high frequency generator 83, energized from the power line 84.

From the foregoing description, the operation of the picker mechanism and of the high frequency heating means operatively associated therewith will be readily understood by those skilled in the art. The picker mechanism is normally held in its rearward position with the fingers 34 retracted and withdrawn within the confines of the stripper plate 52, the fingers 34 being locked in retracted position by the shoulder 68 of the head 62 engaging the surfaces 69 of said fingers. As the head 32 is advanced by the forked arm 45, the rod 60, head 63, head 32 and fingers 34 advance as a unit. The stripper plate 52, however, remains in the position shown in Fig. 2 until the head 32 has advanced sufficiently to engage the rear surface thereof, the pins 53 sliding in the head 32 during this portion of the movement. When the head 32 has advanced to engage the stripper plate 52, the points of the fingers 34 project through the slots 57 in the stripper plate a sufficient distance to engage within the depressed central diaphragm portion of the cap.

Thereafter, the head 32, fingers 34 and stripper plate 52 advance as a unit until the collar 76 of the rod 60 engages boss 61 of the bracket 62 and prevents further forward movement of the rod 60. Further movement of the head 32 then causes the sleeve 44 to move with respect to the rod 60 compressing the spring 64 and releasing the surfaces 69 of the fingers 34 from the shoulder 68 of the head 63, thereby permitting the fingers 34 to snap open, in response to the pressure of the spring 36, into cap engaging position as shown in Fig. 1.

The arrangement is such that the stripper plate 52 engages the pouring lip housing of the forward cap 10 and slightly lifts the stack for straightening and centering the caps before the fingers 34 have been allowed to snap open, thereby assuring the proper positioning of the forward cap with respect to said fingers. When the fingers 34 are snapped open, as above mentioned, the points 38 thereof engage the inner surface of the pouring lip housing 12 and securely grip the same.

On the return stroke of the head 32 the cap 10 is pulled through retaining ring 19 by the points 38 of the fingers 34. The retaining fingers 21 are retracted by the skirt of the cap 10 as it is pulled through the retaining ring 19 but snap back against the skirt of the succeeding cap to strip the same from the forward cap and to prevent more than one cap from being pulled through the retaining ring. It is to be understood, of course, that the fingers 21 may be omitted if the desired stripping action is obtained by the retaining ring itself.

It will be noted that during the return stroke of the head 32, the cap engaged by the fingers 34 will be pulled through the space within high frequency coil 80 and will be exposed to the effect of the high frequency electromagnetic field thereof. This field will raise the temperature of the cap in predetermined regions and more particularly will heat the adhesive band on the pleated skirt thereof to plasticizing or heat-sealing temperatures. While the passage of the cap through the said field is quite rapid and generally does not take any longer than a fraction of a second, this time is fully sufficient to obtain the desired heating effect provided that the frequency and the power of the high frequency generator are properly selected. In order to avoid undesirable heating of the cooperating parts of the picker mechanism by the high frequency field, which would cause substantial losses in high frequency energy, it is preferred to make the elements of the mechanism exposed to such field, such as particularly fingers 34, head 32, stripper plate 52, etc., of a suitable insulating material, such as for example Bakelite. If desired, it is also possible to replace spring 36 with a non-conducting elastic member such as a suitably formed elastic block or plate of rubber performing the same function as the said spring, without, however, causing any appreciable absorption of high frequency electrical energy.

When the fingers 34 have reached a position such that the cam surfaces 70 thereof engage the retracting ring 71, the fingers are retracted and release the preheated cap. At about this point the stripper plate 52 engages the shoulder 56 of the housing 30 and further rearward movement of the head 32 causes the fingers 34 to be withdrawn beyond the forward surface of the stripper plate, thereby leaving a smooth surface down which the released cap slides to the discharge passage 77. The withdrawal of the points 38 of the fingers 34 beyond the surface of the stripper plate 52 eliminates any projections or irregularities which might interfere with the free movement of the released preheated cap to the discharge passage 77. With the fingers 34 retracted the surfaces 69 thereof are again brought into alignment with the shoulder 68 of the head 63 and permit the head to snap outwardly in response to the action of the spring 64 to engage said surfaces and retain said fingers in retracted position.

By the mechanism above described, at each stroke of the arm 45 the forward cap is removed from the supply chamber 18, is preheated in predetermined regions, including the band of thermoplastic adhesive on the pleated skirt thereof, and is deposited in the discharge passage 77. From this discharge passage, the cap may be directly transferred to a station where the preheated cap is picked up by the neck of an advancing bottle, carrying the same to the sealing station where the cap is permanently secured to the neck of the bottle by the application of pressure. The picker mechanism may be actuated in various ways, such as by means of a one-revolution clutch synchronized with respect to the feed of the milk bottles so that the caps are successively picked, preheated and fed to the capping station to meet the advancing milk bottles as they pass such station. As these elements and their cooperation are fully disclosed in Patent No. 2,325,163 and do not form part of the present invention, no detailed description of their structure and operation will be necessary.

It will be noted that the present invention provides various important advantages. Thus, while in prior machines of the described general class preheating of the adhesive band was a relatively slow and gradual operation, the execution of which required a number of moving parts and a substantial amount of machine space, in accordance with the present invention, such preheating is carried out practically instantaneously and without appreciably adding to the time needed for a complete operating cycle including the total time from withdrawing a cap from the magazine until the preheated cap is finally sealed to the neck of the milk bottle. There is no time wasted when the machine is started, but preheated caps are fed to the successive stations practically instantaneously as soon as the operation of the machine has been initiated. The preheating equipment of the invention is extremely simple and compact in character, so much so that it may be easily installed between any two appropriate stations of the capping machine. The energy requirements of the high frequency heating means compare very favorably with those of prior machines.

It is also to be observed that in view of the great simplicity and small size of the high frequency heating means of the invention, they can be readily applied or added to existing equipment without requiring any expensive structural changes.

Moreover, the principles of the invention permit to localize preheating of the caps to the exact region where such heating is desired, such as the adhesive band on the pleated skirts thereof, without appreciably heating other portions of the caps.

Although the present invention has been disclosed in connection with a preferred embodiment thereof, variations and modifications may be resorted to by those skilled in the art without departing from the principles of the invention. Thus, while the invention has been described and illustrated as applied to a capping machine of the type disclosed and claimed in the aforesaid Patent No. 2,325,163, it may be applied with obvious modifications to various types of capping machines. All of these variations and modifications are considered to be within the true spirit and scope of the present invention, as disclosed in the foregoing description and defined by the appended claims.

What is claimed is:

1. In a machine for applying to containers and heat-sealing thereon preformed hood caps having pleated skirts carrying a band of thermoplastic adhesive and being electrically conductive at least in the region of said band, the combination which comprises a cap magazine, picker means for individually withdrawing caps from said magazine, a coil arranged axially in the path of feed of said caps by said picker means so that the caps are passed through said coil by said picker means, and a high frequency generator for energizing said coil to heat the band of adhesive on the caps while they are being advanced therethrough.

2. In a machine for applying to containers and heat-sealing thereon preformed hood caps having pleated skirts carrying a band of thermoplastic adhesive and being electrically conductive at least in the region of said band, the combination which comprises a supply chamber containing a stack of said caps, a feed chute for delivering caps to a station, a picker mechanism having reciprocating means for individually engaging and withdrawing caps from said supply chamber and feeding the withdrawn caps into said chute, a coil coaxially mounted with said supply chamber positioned for the passage of caps therethrough by said picker mechanism and a generator of high frequency oscillations connected to said coil and maintaining a high frequency electromagnetic field therein whereby the band of adhesive on the caps withdrawn from the supply chamber through said coil will be exposed to high frequency heating and the preheated caps will be fed into the said feed chute.

3. In a machine for applying to containers and heat-sealing thereon preformed hood caps having pleated skirts carrying a band of thermoplastic adhesive and being electrically conductive at least in the region of said band, the combination which comprises an inclined supply chamber containing a stack of nested caps with the lowermost thereof partially exposed, a coil coaxially mounted at a short distance from the end of said chamber, a picker mechanism having reciprocable elements adapted to be periodically advanced through said coil to engage the exposed cap and to withdraw said cap through said coil for subsequent delivery to a capping station, and a high frequency generator for energizing said coil to heat the band of adhesive on the cap withdrawn through the coil to heat-sealing temperatures.

4. In a machine for applying to containers and heat-sealing thereon preformed hood caps having pleated skirts carrying a band of thermoplastic adhesive and being electrically conductive at least in the region of said band, the combination which comprises an inclined supply chamber containing a stack of nested gravity-fed caps with the forward cap partially exposed, a single-layer coil coaxially mounted with said chamber at the end thereof, a picker mechanism having reciprocable elements with said coil and displaceable therethrough to engage the exposed cap and to withdraw the same through the coil for subsequent delivery to a capping station, and a high frequency generator energizing said coil to inductively heat the band of adhesive on the cap to heat-sealing temperatures during its passage through the coil, said reciprocable elements of the picker mechanism being constituted of dielectric material to prevent heating thereof by the field of said coil.

5. A machine for applying to containers and heat-sealing thereon preformed hood caps having foldable pleated skirts carrying a thermoplastic adhesive coating and having an electrically conductive character at least in the region of said coating, said machine including a magazine containing a supply of said caps, a coil of a size to allow said caps to pass therethrough, means to remove successive caps from said magazine and feed said caps in succession through said coil, and a source of high frequency energy connected to said coil to establish a high frequency electromagnetic field therein whereby the conductive regions of the caps passing through said coil will absorb electromagnetic energy in amounts sufficient to heat said adhesive to plasticizing temperatures.

HERBERT G. VORE.

REFERENCES CITED

The following references are of record in the file of this patent:

UNITED STATES PATENTS

| Number | Name | Date |
|---|---|---|
| 1,335,538 | Tevander | Mar. 30, 1920 |
| 1,813,425 | Rosaire | July 7, 1931 |
| 1,958,769 | Rundell | May 15, 1934 |
| 2,087,480 | Pitman | July 20, 1937 |
| 2,131,438 | Jensen | Sept. 27, 1938 |
| 2,184,281 | Clark | Dec. 26, 1939 |
| 2,291,862 | Bailey | Aug. 4, 1942 |
| 2,325,163 | Goodwin et al. | July 27, 1943 |
| 2,325,168 | Vore | July 27, 1943 |
| 2,325,638 | Strickland | Aug. 3, 1943 |
| 2,329,188 | Denneen et al. | Sept. 14, 1943 |
| 2,355,493 | Wilcox et al. | Aug. 8, 1944 |
| 2,361,507 | Sonnenberg | Oct. 31, 1944 |
| 2,415,376 | Strickland | Feb. 4, 1947 |